US008418530B1

(12) United States Patent
Scaringe et al.

(10) Patent No.: US 8,418,530 B1
(45) Date of Patent: Apr. 16, 2013

(54) COMPOSITIONS AND METHODS FOR DETECTING LEAKS IN HVAC/R SYSTEMS

(75) Inventors: Robert P. Scaringe, Rockledge, FL (US); Dwight D. Back, Pembroke Pines, FL (US); Lawrence R. Grzyll, Merritt Island, FL (US); John A. Meyer, Palm Bay, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 377 days.

(21) Appl. No.: 12/170,263

(22) Filed: Jul. 9, 2008

Related U.S. Application Data

(62) Division of application No. 11/101,472, filed on Apr. 8, 2005, now abandoned.

(51) Int. Cl.
*G01M 3/00* (2006.01)
*G01M 3/02* (2006.01)
*C09K 3/00* (2006.01)

(52) U.S. Cl.
USPC .................. 73/40.7; 73/23.31; 252/182.11

(58) Field of Classification Search ............. 73/23.31, 73/40.7
See application file for complete search history.

(56) References Cited

U.S. PATENT DOCUMENTS

| | | | |
|---|---|---|---|
| 2,550,498 A | 4/1951 | Rice | |
| 3,144,600 A | 8/1964 | Roberts | |
| 3,742,475 A | 6/1973 | Liebermann et al. | |
| 3,751,968 A | 8/1973 | Loh et al. | |
| 3,979,625 A | 9/1976 | Roberts | |
| 3,991,360 A | 11/1976 | Orth et al. | |
| 4,134,448 A * | 1/1979 | Luksus .................... | 165/62 |
| 4,282,521 A | 8/1981 | Lieberman | |
| 4,294,716 A | 10/1981 | Saccavino et al. | |
| 4,488,118 A | 12/1984 | Jeffers et al. | |
| 4,730,600 A * | 3/1988 | Harrigill ................ | 126/108 |
| 5,087,381 A | 2/1992 | Tamura et al. | |
| 5,104,513 A | 4/1992 | Lee et al. | |
| 5,115,868 A | 5/1992 | Dougherty et al. | |
| 5,284,569 A | 2/1994 | Lee et al. | |
| 5,351,037 A | 9/1994 | Martell et al. | |
| 5,369,983 A * | 12/1994 | Grenfell ................. | 73/40.7 |
| 5,600,057 A | 2/1997 | Hansche et al. | |
| 5,900,185 A | 5/1999 | Tapscott | |
| 5,932,176 A | 8/1999 | Yannopoulos et al. | |
| 6,170,320 B1 | 1/2001 | Scaringe et al. | |
| 6,327,897 B1 | 12/2001 | Scaringe et al. | |
| 6,791,088 B1 | 9/2004 | Williams, II et al. | |
| 2003/0181324 A1 | 9/2003 | Hotta et al. | |

OTHER PUBLICATIONS

DeWerth, D.W. "Three Step Method for Detecting Unacceptable Flue Gas Leakage from Furnace Heat Exchangers", ASHI Technical Journal, vol. 1, No. 2, Jul. 1991.*

* cited by examiner

*Primary Examiner* — Peter F Godenschwager

(57) ABSTRACT

Compositions and related methods for detecting leaks in HVAC/R components such as furnaces, portable gas heaters, swimming pool heaters, air conditioners, heat pumps, refrigerators, freezers, and other closed loop vapor compression systems, as well as heat exchangers. These compositions provide more sensitive detection of leaks in inaccessible areas of furnaces using low ODP and non-flammable compounds classified as hydrofluorochloro-ethers (HFCE's), hydrobromochlorofluoro-alkenes (HBCFA's) hydrofluoro-ethers (HFE's), and halogenated compounds which are either alkanes, alcohols, diones, acetates, ketones (e.g., butanones, pentanones), esters (e.g., propanoates), anhydrides, cycloalkanes (cycloparaffins), cycloalkenes (cycloolefins), heterocyclics (e.g., furans), and aromatics.

2 Claims, 4 Drawing Sheets

COMPOSITIONS AND METHODS FOR DETECTING LEAKS IN HVAC/R SYSTEMS

CROSS-REFERENCE TO RELATED APPLICATIONS

The present application is a divisional application of application Ser. No. 11/101,472 filed Apr. 8, 2005, the disclosure of which is incorporated herein by reference in its entirety.

FIELD OF THE INVENTION

The present invention relates generally to detecting leaks in HVAC/R systems and more particularly to fluid compositions useful to detect leaks in HVAC/R systems, e.g., furnaces and vapor compression systems, as well as methods of using certain compounds to detect leaks in closed systems such as those in high-efficiency condensing furnaces. This invention also relates to detecting leaks in heat exchangers such as radiators, shell and tube heat exchangers, fin and tube heat exchangers and plate fin heat exchangers.

BACKGROUND OF THE INVENTION

Heating, Ventilation, Air Conditioning and Refrigeration (HVAC/R) components frequently develop leaks which are sometimes difficult to locate or are not accessible without disassembling all or part of the HVAC/R system. Leaks affect the performance of the HVAC/R system and can even become life-threatening (e.g., CO leaks in a furnace). Similarly, leaks in closed loop plumbing systems are sometimes difficult to locate without disassembly.

Furnaces operate by combusting a gas such as methane or propane, and flowing unconditioned fluid over or through a heat exchanger to heat the fluid. In all cases the combustion gases are separated from the conditioned (heated) building supply air by a normally leak-tight barrier so as to prevent harmful combustion gases and combustible gas byproducts from reaching the habitable spaces. This leak-tight barrier houses the heat exchanger and associated piping and or ductwork and is referred to as the "heat exchanger" herein. The fluid can be a gas (e.g., air) or liquid (e.g., water). The heat exchanger can develop leaks which can decrease the efficiency of the furnace and leak combustion gases and byproducts into the conditioned fluid.

Several methods are known to detect leaks in HVAC/R systems or other closed systems. The methods vary somewhat between vapor compression systems (such as heat pumps, air conditioners, refrigerators, etc.) and furnaces because vapor compression systems have a significant pressure differential, typically 100's of psi (pounds per square inch) pressure differential between the working fluid contained in the system and the environment, whereas in the case of hot air furnaces the pressure difference between the combustion gases and the conditioned air are only a few inches of water pressure (Note: 1 inch or water pressure=0.036 psi). The higher pressure differential in vapor compression systems means that small leaks are typically easier to detect, because the higher pressure differential will force more of any indicator compound through the leak (and make more noise, in the case of acoustic detection).

In general, the leak detection methods range from visual to sensitive electronics. Visual methods include applying a soap solution to the joint or surface where a leak is suspected, and observing for bubble formation caused by the pressure differential between the two regions. This method requires that the technician has access to the suspect area, that a significant pressure differential exists between the two regions where a leak is suspected, and that suspect areas have already been identified. Currently there are furnace leak detectors for natural draft furnaces, as described in U.S. Pat. No. 5,600,057, which rely on spraying a relatively benign fire suppressant (e.g., sodium bicarbonate) into the heated conditioned air stream while observing if there is any change in the flame on the combustion air side of the heat exchanger. If there is any change in the flame's characteristics, usually identified by a color change, then the fire suppressant must be leaking into the combustion side and affecting the flame. While this simple leak detection approach is effective for natural draft furnaces, it is inapplicable for the newer high-efficiency condensing furnaces, because the operator cannot see the flame and therefore cannot see any color change in the flame. Another problem with this method is that the leaks have to be quite substantial to noticeably affect the flame. This technique relies on the pressure difference created by the conditioned air blower to force the liquid fire retardant into the combustion flame which causes a visual difference in the flame temperature, thus changing the flame color.

Yet another visual method is the use of visual or fluorescent dyes. The fluorescent dyes are invisible under ordinary lighting, but visible under ultraviolet (UV) light. The dyes are typically introduced into the vapor compression system when the system is serviced. Leaks are detected by visual inspection of the external surface of the system, and a significant pressure differential between the two regions is necessary to drive the dye though the leak. For fluorescent dyes, a UV light is used to search for dye that has escaped from the system (for example, see U.S. Pat. Nos. 6,327,897 and 6,170,320). The color of the dye when subjected to UV light is normally a bright green or yellow and is easily seen. These methods again require that the technician has access to the suspect area, that a significant pressure differential exists between the two regions where a leak is suspected, and that suspect areas have already been identified.

Other means to detect leaks include the use of compounds which produce a distinct odor. Methane, or natural gas, is sometimes doped with a sulfur-containing gas species which can be easily detected by smell. Ammonia can also be used in this way. These methods are imprecise, and do not allow for pinpointing leaks to any particular area of the HVAC/R system since the odor emanates around the entire HVAC/R system. Some of the compounds used for this method are also toxic if inhaled. U.S. Pat. No. 4,294,716 describes materials which can be used as an odorant for halocarbons and azetropes, primarily chlorofluorocarbons, commonly used as refrigerants in refrigeration, air conditioning and process cooling systems.

Acoustic leak detection is another method. The system is designed to detect very small leaks in pressurized systems, such as vapor compression systems, power boilers, recovery boilers and feedwater heaters. On a boiler, it performs this function by continuously measuring the internal sounds using piezoelectric sensors. The sensors are located in every section of the boiler and number between 12 and 40 per unit depending upon the size of the boiler. The sensor converts the vibrations caused by a tube leak to a voltage, which the system logs and trends. This type of leak detector requires multiple sensors placed throughout the HVAC/R system. The detector system is expensive, and may not be effective in detecting small gas leaks.

Other detection methods utilize a compound which can produce an electronic signal. These types of leak detectors can be placed into one of three categories: nonselective, halogen-selective, or compound-specific. In general, as the specificity of the monitor increases, so does the complexity and cost. In HVAC/R applications, these detectors typically sense the halogens F, Cl, and Br.

In 1963, the Corona Discharge Detection Method (or electrical discharge method), revolutionized the electronic leak detector. A corona is an electrical discharge effect that causes ionization of a molecule. Over the years this concept was refined and improved with extensive research into electrode metals, tip shell materials and finishing procedures as well as circuitry changes and features to improve response time and "clearing" time. One of the most significant advances for this method was the introduction of the "micro-pump" probe assembly. This small motor-driven fan assembly, mounted in the probe handle, actively draws air into the sensing tip. This gives appreciably quicker response time than a system which relies only on diffusion for a gas leak to penetrate the tip, and very much quicker clearing time. These devices were originally designed for chlorine containing compounds, since it is readily detected by corona discharge. Configuring these devices to detect fluorine requires major changes in tip sensitivity and circuit gain since fluorine sensitivity is a factor of 20 or less relative to chlorine.

Sensors such as that described in U.S. Pat. No. 2,550,498 are electrical discharge devices for receiving a sample of an atmosphere containing a concentration of a substance to be detected and comprising cathode and anode elements for producing and collecting ions. U.S. Pat. No. 3,144,600 discloses a halogen leak detector comprising an electrical discharge device sensor with an amplifier of variable gain for amplifying the output current of the sensor. A refrigerant gas leak detector is disclosed in U.S. Pat. No. 3,742,475 that uses a high voltage applied across a pair of electrodes in an atmosphere to generate a continuous corona across the electrodes. In U.S. Pat. No. 3,991,360 a sensor assembly for a halogen gas leak detector which includes a tubular, porous, high purity Alumina ($Al_2O_3$) element for supporting electrode and heater components. Another leak detector is disclosed in U.S. Pat. No. 4,282,521 that senses the concentration of gaseous impurities by applying a high voltage across a pair of electrodes to generate a continuous corona current and detecting change in the corona current. Another halogen gas leak detector is disclosed in U.S. Pat. No. 4,488,118 which operates by applying a high voltage across a pair of electrodes to generate a continuous corona current and detecting the presence of halogen gas by sensing changes in the corona current. In U.S. Pat. No. 5,351,037, a refrigerant gas leak detector for detecting the location of leaks of refrigerant gas such as halogen has a sensing tip with a pair of electrodes across which a relatively high voltage is generated to cause a corona current to pass through the electrodes. The voltage applied across the electrodes is varied to maintain the corona current through the electrodes at a substantially constant magnitude. This leak detector includes a gas sensing circuit that detects changes in the concentration of refrigerant gas by sensing the voltage applied to the electrodes.

Heated element detectors also function by using ions from a gas or vapor. These detectors are solid state sensors having the ability of selectively detecting the presence of many gases and vapors within an atmosphere. A solid state element, which contains alkali metal ions for example, which readily accept negative ions (e.g., halogens) of gases and vapors, is brought into reactive contact therewith. The element is prepared to create an outer layer along its boundaries that is depleted of ions. The conductivity of the heated element in an atmosphere free of the reactive gases and vapors is low. However, the presence of one or more of the reactive gases and vapors causes ions to flow across the depletion boundary and increases the conductivity of the element. An electrical circuit then detects an increase in the conductivity of the element, generating a signal indicative of the presence of a reactive constituent in the test atmosphere. U.S. Pat. Nos. 5,932,176, 5,104,513, 5,284,569, 3,751,968, and 3,979,625 describe devices using this principle.

Nonselective detectors are those that will detect any type of emission or vapor present, regardless of its chemical composition. Typical detectors in this category are based on electrical ionization, thermal conductivity, ultrasonics, or metal-oxide semiconductors. These detectors are typically quite simple to use, very rugged, inexpensive (normally less than $500), and almost always portable, thus making them ideal for leak pinpointing applications. However, their inability to be calibrated, long-term drift, lack of selectivity, and lack of sensitivity (detection limits usually between 50 and 100 ppm for 1,1,1,2-tetrafluoroethane (hydrofluorocarbon 134a, or HFC-134a)) limit their use for area monitoring.

Halogen-selective detectors use a specialized sensor that allows the detection of compounds containing the halogens fluoride, chloride, bromide, and iodide without interference from other species. The biggest advantage of these detectors is a reduction in the number of false alarms caused by the presence of other compounds with the halogen-containing refrigerant. These detectors are typically easy to use, feature higher sensitivity than the nonselective detectors (detection limits are typically <5 ppm when used as an area monitor and <0.05 oz/yr when used as a leak pinpointer), and are very durable. In addition, due to the partial specificity of the detector, these instruments can be calibrated easily. These types of detectors are commonly used by HVAC/R technicians, and are relatively inexpensive and compact. Typically, these halogen leak detectors for halogen-containing compounds function indirectly or directly from the ionization of halogen-containing compounds, and the types of sensors currently used include corona discharge or heated elements.

The most complex and expensive detectors are compound-specific detectors. These detectors are typically capable of detecting the presence of a single species without interference from other compounds. Compound-specific detectors typically are infrared-based (IR), although some of the newer types are infrared-photoacoustic based (IR-PAS). For example, see U.S. Pat. No. 6,791,088. The IR and IR-PAS detectors normally have detection limits around 1 ppm, depending upon the compound being detected. There are also several IR detectors on the market that have detection limits of approximately 10 ppm. These detectors typically have a much lower price per unit and are less complex than those with lower detection limits. For refrigerants other than 2,2-dichloro-1,1,1-trifluoroethane (hydrochlorofluorocarbon 123, or HCFC-123), these units probably will yield acceptable performance. Due to recent improvements in technology, the price of the compound-specific detectors has dropped by about 50 to 60% during the last year. For most of 1991, IR-based detectors could be purchased for approximately $10,000 per unit. In 2005, units with comparable performance are available for only $3,500 to $4,000.

The sensitivity of a device is determined by a number of factors. The most important factors for leak detection are the method of detection and the material being detected. For example, a halogen leak detector that demonstrates high sensitivity for dichlorodifluoromethane (chlorofluorocarbon 12, or CFC-12) may have worse sensitivity for HCFC-123 and very poor sensitivity for HFC-134a. Sensitivity differences of 20-1000× have been reported when comparing CFC-12 to HFC-134a with some halogen leak detectors. In this case, the variations in sensitivity would be due to less chlorine, which is very easily ionized and detected. The bond dissociation energies of $CH_3$—Cl and $CH_3$—Br are 22% and 35% less than that of $CH_3$—F, which further illustrates the relative ease by which Cl and Br can be dissociated from organic molecules compared to fluorine, making their detection much easier. Compounds which contain more atoms of fluorine per molecule and are more easily broken down in a halogen leak detector would also provide enhanced sensitivity, especially for more easily dissociated compounds which ONLY contain fluorine and not Cl and/or Br.

Detection limits for monitors are measured in two ways: oz/yr for pinpointing applications and ppm for area monitoring. Portable leak pinpointers typically have detection limits reported around 0.25 oz/yr, while area monitors have detection limits as low as 1 ppm, although a more typical value is 3 to 4 ppm for most compounds.

SUMMARY OF THE INVENTION

In its most basic aspects, the present invention provides compositions for leak detection in HVAC/R, plumbing, heat exchangers and other closed or sealed systems which are used in conjunction with commercially available halogen leak detectors, as well as related methods of leak detection which use specified compounds. The inventive compositions overcome the disadvantages of current leak detection fluids by providing compositions which are non-flammable (e.g., difficult to ignite, the % of hydrogens on the molecule base on a saturated hydrocarbon is less than 50%, or flammability not observed in flammability tests), and have a very low Ozone Depletion Potential (ODP), yet provide enhanced sensitivity for detecting leaks when compared to current methods which include using the refrigerant already contained in the system or using HCFC-22/nitrogen leak check gases. This overcomes the limitations of current leak detection systems by including F, Cl and/or Br containing compounds with an optional pressurizing compound or propellant, and allows the use of common and commercially available halogen leak detection devices which are relatively inexpensive. Prior to this invention, leak detection in HVAC/R systems has relied on using refrigerants such as chlorodifluoromethane (hydrochlorofluorocarbon 22, or HCFC-22) and HFC-134a, a dye, or flame coloration. This invention teaches compounds that can be introduced into a system suspected to have leaks to boost or enhance leak detection. Alternatively, a system to be leak checked can be evacuated and charged with a small quantity of these compositions (or the relevant compounds), and optionally pressurized with other gases such as nitrogen, argon, or compressed air. A halogen leak detector is then used to detect for leaks. Since Cl and Br are more easily ionized than F, the addition of these ions into a leak detecting fluid can enhance the leak detection signal by a factor of about 20-1000×. Tropodegradable structures are also more likely to breakdown in halogen leak detectors providing enhanced sensitivity even for compounds which contain only fluorine.

The current invention also teaches a method of using leak detection compositions in conjunction with standard refrigerant halogen leak detectors and the combustion blower of High Efficiency Condensing Furnaces and boilers to allow a method of leak detection.

This invention teaches fluid compositions which can be used to detect leaks in HVAC/R systems, plumbing systems and the like, e.g., furnaces, heat exchangers and vapor compression systems, as well as a method of using the compounds of these compositions in related methods, including, for instance detecting leaks in high-efficiency condensing furnaces. The compositions are preferably fluids which contain halogens that are easily detected using commercial halogen leak detectors. This invention provides the compositions and methods to enhance leak detection capability in HVAC/R systems by including compounds which are non-flammable, have low ozone depletion potential, and may contain Cl and/or Br atoms. These compounds are classified as tropodegradable and breakdown more easily than CFC's and HCFC's in the earth's atmosphere. The invention also relates to the novel discovery that the preferred compounds, which typically contain a double bond (C=C), C=O bonds, aromatic bonds and/or ether bonds (C—O), are more easily detected in a halogen leak detector which relies on the breakdown of a compound. By selecting compounds in this category which have a high atomic content of halogens, and/or Cl and/or Br, the sensitivity of a commercially available halogen leak detector is enhanced.

The inventive compositions are preferably fluids which may be dispersed by spraying or otherwise introducing the fluid into a system. If spraying is used, then there are a variety of propellants or pressurants that can be used including, but not limited to, carbon dioxide, nitrous oxide, HFC-134a, argon, compressed air and nitrogen to atomize the spray. If the fluid is introduced into a closed system as a liquid, then there are again a variety of optional pressurants that can be used to increase the pressure differential between the exterior and interior of the device being leak checked, including, but not limited to, carbon monoxide, nitrous oxide, HFC-134a, compressed air and nitrogen. Those skilled in the art will understand that other propellants or pressurants could equally be used. The leak detection enhancing compounds of this invention can also be introduced directly into the working fluid (e.g., refrigerant) of the device, for example using a method as described in U.S. Pat. No. 5,996,651.

Halogen leak detectors are commonly used in the HVAC/R industry to diagnose systems. These detectors are typically more sensitive to Cl and Br than F, so the inclusion of Cl or Br atoms is advantageous to improving leak detection capability by as much as 20-1000×. We have found that it is possible to include Cl- and Br-containing compounds for leak detection since the molecules they are present on have a low ODP, in contrast to CFC's (which also contain Cl), for example, which have a high ODP and can no longer be vented or even produced in the United States under the Clean Air Act (as part of the U.S. cooperation in the Montreal protocol treaty among nations). For purposes of this disclosure, a CFC means a compound that includes only chlorine, fluorine and carbon atoms, is saturated (meaning there are no multiple bonds between adjacent carbon atoms), and does not contain any heteroatoms such as oxygen.

The compounds of this invention are generally classified as tropodegradable, and therefore have a much lower ODP than other compounds, such as CFC's. The structural vulnerabilities of these compounds render the molecules unstable and within a fairly short period of time, they break down and are no longer part of the atmosphere. We have also discovered that many of these compounds also break down more easily in halogen leak detectors, making the detector more sensitive, even if the compounds only contain fluorine. Tables 1 and 2 below summarize the ODP and other properties of HCFC-22, a current leak detection fluid, and the leak detection enhancers of this invention. The halogen leak detection devices commonly used for leak detection in the HVAC/R industry are much more sensitive to Cl than F. The sensitivity of these detectors to Cl is typically 20-1000 times higher.

The inventive compositions can be used to detect leaks in a variety of HVAC/R system components, including furnaces, portable gas heaters, pool heaters, air conditioners, radiators, heat pumps, refrigerators, freezers, heat exchangers, plumbing, duct-work, fluid systems and other closed loop vapor compression systems. The leak detection enhancement compounds can be combined with a pressurant or propellant and sprayed, the leak detection compounds can be added to a refrigerant, or the leak detection compounds can be added before or after the introduction of a pressurant such as nitrogen into an HVAC/R system or component.

For the method of leak detection disclosed herein for furnaces, it is also desirable to use a compound which is much heavier than air, so that when it is introduced into the conditioned air supply duct above the furnace the compound will fall down into the furnace rather than rise into the ductwork leading from the furnace. (Note that the conditioned air blower is off during this type of leak test, as described in this invention). For the furnace method (including high efficiency furnaces) of leak detection, it is advantageous to have at least some of the leak detection enhancement compounds present as a liquid since they will persist in the area of the leak for an extended period of time until all of the fluid has evaporated. This extends the leak detection time and provides a longer period of time for leak diagnosis and migration to the leak. This is also advantageous for leak detection in other HVAC/R systems.

For the method of leak detection in evacuated air conditioning and refrigeration systems, there are advantages to using compounds which have a vapor pressure about the same as or greater than that of the propellant or pressurant, and/or compounds characterized as having a boiling less than about 40° C. or 40° C. This provides for a sufficient quantity of leak detection enhancing compounds as a vapor which can diffuse through the refrigeration or air conditioning system to the site of the leak.

One object of certain embodiments of the present invention is to provide a method of using any leak detection fluid in combination with standard halogen refrigerant leak detectors in gas-fired hot air furnaces to detect leaks or other improper pathways between the combustion air and the (heated) conditioned air introduced into the building.

Another object of certain embodiments of the present invention is to provide a method of using any leak detection fluid in combination with standard halogen refrigerant leak detectors in gas-fired hot water furnaces or boilers to detect leaks or other improper pathways between the combustion air and the heated water used to heat the building.

Yet another object of certain embodiments of the present invention is to provide a method of using this leak detection fluid in combination with heat exchangers of any type to detect leaks or other improper pathways between any of the fluid pathways that are to be thermally connected but mechanically isolated to keep the fluids from contacting or mixing in any way.

And yet another object of certain embodiments of the present invention is to provide a method of using this leak detection fluid in combination with sealed vapor compression systems to detect leaks or other improper pathways between the sealed system and the environment. This includes injection or inclusion of the leak detection enhancement fluid directly into the vapor compression system working fluid, or the introduction of the leak detection enhancement fluid into an evacuated vapor compression system with or without a pressurant.

And yet another object of certain embodiments of the present invention is to provide a method of using this leak detection fluid in combination with any sealable system or subsystem were cracks, leaks, or other permeabilities are desired to be detected.

And yet another object of certain embodiments of the present invention is to provide hydrofluorochloro-ethers (HFCE's), hydrobromochlorofluoro-alkenes (HBCFA's), hydrofluoro-ethers (HFE's), and halogenated compounds selected from alkanes, alcohols, diones, acetates, ketones (e.g., butanones, pentanones), esters (e.g., propanoates), anhydrides, cycloalkanes (cycloparaffins), cycloalkenes (cycloolefins), heterocyclics (e.g., furans), and aromatics, which can be used to enhance the leak detection capability in HVAC/R systems as well as other closed, sealable or sealed systems or subsystems where cracks, leaks, or other permeabilities are desired to be detected.

Still another object of certain embodiments of this invention is to provide leak detection fluid compositions which have a low ODP and are non-flammable, yet provide higher sensitivity in halogen leak detectors.

Another object of certain embodiments of this invention is to provide the means to enhance or boost the leak detection capability in HVAC/R systems with currently available halogen leak detectors.

BRIEF DESCRIPTION OF THE DRAWINGS

Features and advantages of the present invention will become apparent to those skilled in the art from the following description with reference to the drawings, in which.

NOMENCLATURE AND ABBREVIATIONS

Figure 1:
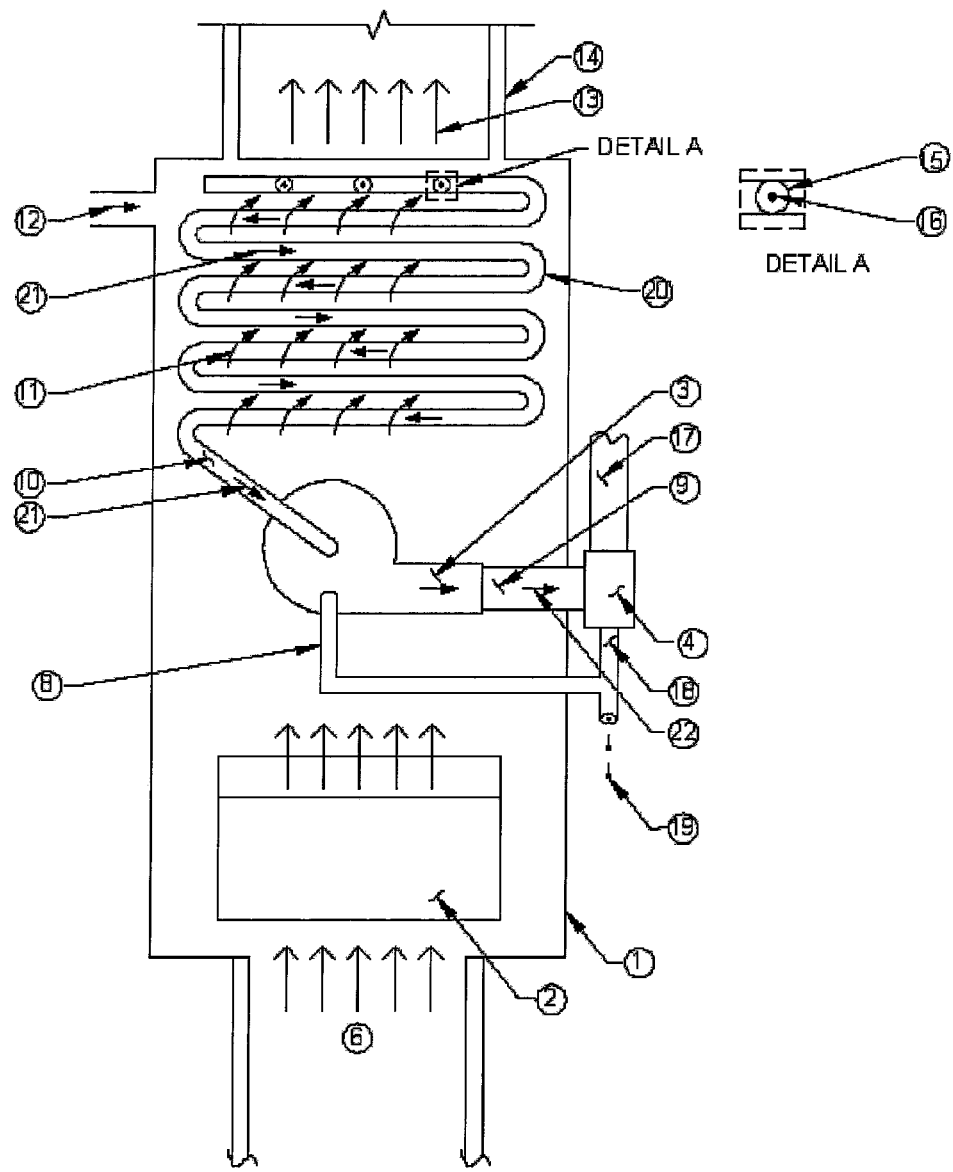
FIG. 1 shows a diagram of high efficiency condensing gas furnace.

CFC: chlorofluorocarbon
HCFC: hydrochlorofluorocarbon
HFC: hydrofluorocarbon
HFCE: hydrofluorochloro-ether
HBCFA: hydrobromochlorofluoro-alkene
HFE: hydrofluoro-ether
HVAC/R: heating, ventilation, air conditioning, and refrigeration, in the context of this disclosure, examples of HVAC/R systems include, but are not limited to: furnaces, portable gas heaters, boilers, pool heaters, air conditioners, heat pumps, refrigerators, freezers, and other closed loop vapor compression systems.
ODP: ozone depletion potential
BP: boiling point
MW: molecular weight
R: refrigerant
Combustion gas: Refers to the products of combustion as well as any combustion residue and/or remaining fuel.

DETAILED DESCRIPTION OF THE INVENTION

For simplicity and illustrative purposes, the principles of the present invention are described by referring mainly to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the true spirit and scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation.

Leaks can develop in HVAC/R systems which are difficult, and sometimes impossible to see visually or access. The present invention relates to leak detection fluids which enhance leak detectability in HVAC/R systems using traditional HVAC/R halogen leak detectors as well as methods of using traditional halogen leak detectors to detect leaks in furnaces and boilers. It is well known that chlorine (Cl) and bromine (Br) are more easily detected by halogen leak detectors than fluorine (F). Unfortunately, many Cl and Br compounds are being phased out by the EPA due to their ozone depletion potential (ODP). However, we have discovered a class of compounds that contain Cl and/or Br and which have an ODP lower than about 0.02. Preferred compounds have an ODP of about 0.02 or less. The EPA has phased out compounds with ODP values greater than 0.2 ("Class I"). Compounds having an ODP less than 0.2 are denoted as "Class II" compounds and are scheduled to be phased out over the next few decades. These Class II compounds include HCFC's. Some of the lowest ODP's of compounds in Class II are about 0.02, so it is a preferred embodiment of this invention to select compounds having an ODP less than 0.02, and more preferably less than about 0.01. Compounds which contain only fluorine and hydrogen attached to the carbon structure, as well as other heteroatoms such as oxygen (e.g., ethers), by definition have an ODP of "0" and are also advantageous in this invention The compounds taught by this invention are also non-flammable, or very difficult to ignite, due to their unique structure and chemical properties. Compounds which contain only fluorine and are tropodegradable are also effective leak detector enhancers. This is due to their structural vulnerabilities which make them more susceptible to ionizing and hence more easily detectable by halogen leak detectors. The structural weaknesses can take such forms as hydrogen being present on the molecule, a carbon-carbon double bond that is vulnerable to reactions, an ether bond, a chlorine atom, or a bromine atom being present for easy degradation. Many of these compounds, e.g., halogenated compounds which are either alkanes, alcohols, diones, acetates, ketones (e.g., butanones, pentanones), esters (e.g., propanoates), anhydrides, cycloalkanes (cycloparaffins), cycloalkenes (cycloolefins), heterocyclics (e.g., furans), and aromatics, also contain a high number of halogens per mole of compound.

These compounds can be mixed with an optional propellant or pressurant and used to detect leaks in a variety of HVAC/R components including furnaces, portable gas heaters, pool heaters, air conditioners, radiators, heat pumps, refrigerators, freezers, plumbing, duct-work, fluid systems and other closed loop vapor compression systems. The low ODP of these compounds is a result of their structure which is easily broken down in the environment. This characteristic also makes them ideal as leak detection fluids since they will be more readily broken down and detected by commonly used halogen leak detectors.

The classes of compounds preferred in one embodiment of this invention, which we have found to enhance the leak detection capability in HVAC/R systems, are: halogenated alkanes, alcohols, diones, acetates, ketones (e.g., butanones, pentanones), esters (e.g., propanoates), anhydrides, cycloalkanes (cycloparaffins), cycloalkenes (cycloolefins), heterocyclics (e.g., furans), ethers, alkenes, and aromatics. More specifically, these compounds are (a) fluorinated alkanes having more than 1 carbon atom, fluorinated alkanes with 1 carbon atom and no chlorine atoms, fluorinated diones, fluorinated heterocyclics, fluorinated cycloalkanes, fluorinated anhydrides, fluorinated ketones, fluorinated cycloalkenes, fluorinated aromatics, fluorinated acetates, fluorinated ethers, fluorinated esters, fluorinated alcohols, and fluorinated alkenes; and (b) partially fluorinated aromatics, ketones, ethers, and alkenes which contain one bromine atom. Although not necessary, it is preferable that the compounds of this invention possess a tropodegradable character such as hydrogen atoms, an ether bond and/or a double bond, and may contain Br and/or Cl atoms. Preferred compounds with these features include the following categories: (a) hydrofluorochloro-ethers (HFCE's), (b) hydrobromochlorofluoro-alkenes (HB-CFA's) and (c) hydrofluoro-ethers (HFE's).

These compounds can be used with a pressurant or propellant, including mixtures of two or more of these compounds. Table 1 below lists some examples of leak detection enhancers of this invention, and their properties. Table 2 below provides are more comprehensive list of example compounds preferred by this invention. Any of the compounds of Tables 1-4 below are suitable for the compositions and methods contemplated herein.

Compounds that have boiling points above about 40° C. or at least 40° C., have low ODP, and are non-flammable have been identified and described in copending patent application Ser. No. 11/043,091 entitled Compositions of Replacement Solvents Having Improved Properties, the disclosure of which is hereby incorporated by reference. Table 1 lists some of some of these compounds and several properties including ODP and boiling point.

TABLE 1

EXEMPLARY LEAK DETECTION ENHANCERS AND THEIR PROPERTIES

| COMPOUND | MW | halogens/mole | BP (° C.) | ODP |
|---|---|---|---|---|
| 4-bromo-3-chloro-3,4,4-trifluoro-1-butene | 223 | 5 | 99.7 | 0.01 |
| 1-chloro-2,2,2-trifluoroethyl difluoromethyl ether | 184 | 6 | 48.8 | 0.02 |
| 2-chloro-1,1,2-trifluoroethyl difluoromethyl ether | 184 | 6 | 56.7 | 0.02 |
| 1-bromo-2-(trifluoromethyl)-3,3,3-trifluoropropene | 243 | 7 | 49.3 | 0.01 |
| methyl 2,2,2-trifluroethyl-1-(trifluoromethyl)ether | 182 | 6 | 50.8 | 0.00 |
| heptafluoropropyl 1,2,2,2-tetrafluoroethyl ether | 286 | 11 | 41.0 | 0.00 |
| methyl perfluorobutyl ether | 250 | 9 | 51.0 | 0.00 |
| ethyl perfluorobutyl ether | 264 | 9 | 73.0 | 0.00 |
| 4-bromo- 3,3,4,4-tetrafluoro-1-butene | 207 | 5 | 55.0 | 0.01 |
| 2-chloro-1,1,2-trifluoroethyl ethyl ether | 163 | 4 | 88.9 | 0.00 |
| fluoromethyl 2,2,2-trifluoro-1-(trifluoromethyl)ethyl ether | 200 | 7 | 59.0 | 0.00 |

Table 2 is a more complete list of preferred compounds with a boiling point greater than about 40° C. or at least 40° C. for use as leak detection substances.

TABLE 2

PREFERRED COMPOUNDS, BP >40° C.

4-bromo-3-chloro-3,4,4-trifluoro-1-butene
1-chloro-2,2,2-trifluoroethyl difluoromethyl ether
2-chloro-1,1,2-trifluoroethyl difluoromethyl ether
1-bromo-2-(trifluoromethyl)-3,3,3-trifluoropropene

TABLE 2-continued

PREFERRED COMPOUNDS, BP >40° C.

methyl 2,2,2-trifluroethyl-1-(trifluoromethyl)ether
4-bromo-1,1,1,3,4,4-hexafluoro-2-(trifluoromethyl)-2-butene
heptafluoropropyl 1,2,2,2-tetrafluoroethyl ether
perfluorodibutyl ether
4-bromo-1,1,1,4,4-pentafluoro-2-(trifluoromethyl)-2-butene
methyl perfluorobutyl ether
3-bromo-1,1,2,3,4,4,4-heptafluorobutene
1-bromo-1,3,3-tetrafluoro-2-(trifluoromethyl)-1-propene
4-bromo-1,1,2,3,3,4,4-heptafluorobutene
2-bromo-1,1,1,3,4,4,4-heptafluoro-2-butene
3,3,3-trifluoro-bis-2,2-(trifluoromethyl)-1-propanol
1,2-(Z)-bis(perfluoro-n-butyl)ethylene
1,1,1,3,3,3-hexafluoro-2-(trifluoromethyl)-2-propanol
2H,3H-decafluoropentane
ethyl perfluorobutyl ether
1-bromo-perfluoro-2-butene
1,1,1,5,5,5-hexafluoro-2,4-pentanedione
perfluoro-2-butyltetrahydrofuran
1H,2H,4H-nonafluorocyclohexane
2-bromo-1,1,1,4,4,4-hexafluoro-2-butene
1-bromo-bis(perfluoromethyl) ethylene
1-(bromodifluoromethoxy)-2-(trifluoromethyl)-1,3,3,3-tetrafluoro-1-propene
1-methoxy-2-trifluoromethyl-1,3,3,3-tetrafluoro-1-propene
fluoromethyl 2,2,2-trifluoro-1-(trifluoromethyl)ethyl ether
2,3-dichlorohexafluoro-2-butene
2-bromo-3,3,4,4,4-pentafluorobutene
3-bromo-2,3,4,4,4-pentafluorobutene
4-bromo-2,3,3,4,4-pentafluorobutene
1-(bromodifluoromethoxy)-1,2,3,3,3-pentafluoro-1-propene
3-bromo-3,3-difluoro-2-(trifluoromethyl)-propene
1-bromo-1,1,4,4,4-pentafluoro-2-butene
3,3-dichloro-1,1,1,2,2-pentafluoropropane (HCFC-225)
1-(bromodifluoromethoxy)-2-(trifluoromethyl)-3,3,3-trifluoro-1-propene
methyl 1,1,2,2,3,3-hexafluoropropyl ether
trifluoroacetic anhydride
2-bromo-1,1,2,2-tetrafluoroethoxy-trifluoroethene
2,2-difluoroethyl 1,1,2,2-tetrafluoroethyl ether
1,3-dichloro-1,1,2,2,3-pentafluoropropane
bis(2,2,2-trifluoroethyl)ether
methyl heptafluoropropyl ketone
difluoromethyl 2,2,3,3-tetrafluoropropyl ether
4-bromo-3,3,4,4-tetrafluoro-1-butene
bis (difluoromethoxy) -tetrafluoroethane
1-(2,2,2-trifluoroethoxy)nonafluoro-cyclohexene
1,2-dichloro-3,3,4,4,5,5,6,6-octafluoro-cyclohexene
1-bromo-1,2-difluoro-2-(2,2,2-trifluoroethoxy)ethene
(bromodifluoromethyl)-pentafluorobenzene
1-(bromodifluoromethoxy)-2-(trifluoromethyl)ethene
2-bromoheptafluorotoluene
(2,2,2-trifluoroethyl)(2-bromo-2,2-difluoroethyl)ether
3-bromoheptafluorotoluene
4-bromoheptafluorotoluene
1-(bromodifluoromethoxy)-1-(trifluoromethyl)ethene
perfluorotoluene
methyl trichloroacetate
1-bromo-2,4,6-tris(trifluoromethyl)benzene
methyl pentafluoropropanoate
4-bromo-1,1,2,3,3-pentafluorobutene
1-(bromodifluoromethoxy)-2-(trifluoromethoxy)ethene
1,1,4,4,4-pentafluoro-1-bromo-2-butanone
1,1,5,5,5-pentafluoro-1-bromo-3-pentanone
1,2-dichloro-hexafluoro-cyclopentene
3-bromo-2,3,3-trifluoropropene
3-bromo-1,3,3-trifluoropropene
3-bromo-3,3-difluoro-1-propene In general, the preferred compounds, including those in Table 2, are halogenated acetates, alcohols, alkanes, alkenes, anhydrides, aromatics, cycloalkanes, cycloalkenes, diones, esters, ethers, heterocyclics, or ketones, with or without the heteroatom bromine. Preferred compounds have boiling points greater than about 40° C. or at least 40° C. and correspond to the following chemical formula: $C_qH_rBr_xCl_yF_zO_p(db)_s$, where db refers to a "double bond" meaning a C=C element in the molecule, and q=3-10, r=0-5, x=0-1, y=0-2, z>1, p=0-3, and s=0-1. The total halogen content of each molecule is x+y+z>1. Preferred embodiments are those compounds with y>0 and/or x=1 and/or s=1 and/or p=1 and/or r>0, and x+y+z between 3 and 18. Preferred compounds also exclude CFC's. This corresponds to compounds with at least one of (a) p>0,
(b) r>0,
(c) x=1, and
(d) s=1, when y>0 and z>1. Compounds with non-flammable properties are preferred, and are generally characterized by r/(2*q+2)<0.5.

Other preferred compounds have boiling points less than about 40° C. or no greater than 40° C. and are described by the formula: $C_aH_bBr_cCl_dF_eO_f(db)_g$ where db refers to a "double bond" meaning a C=C element in the molecule, and a=1-5, b=0-4, c=0-2, d=0-2, e=2-10, f=0-2, and g=0-2. Preferred embodiments are those compounds with c=1 and/or g=1 and/or f=1 and/or b>0, and c+d+e between 2 and 10. Preferred compounds also exclude CFC's and single carbon HCFC's such as HCFC-22, which has a high ODP. This corresponds to compounds with at least one of (a) f>0, when d>0 and e>1,
(b) b>0, when d>0, e>1, and a>1,
(c) c>0, when d>0 and e>1,
(d) g>0, when d>0 and e>1, and
(e) d=0, when a=1 and e>1.

Preferred non-flammable compounds are generally characterized by b/(2*a+2)<0.5. Many of these compounds belong to the classes of hydrofluorochloro-ethers (HFCE's), hydrobromofluorochloro-alkenes (HBFCA's), and hydrofluoro-ethers (HFE's). These formulas for compounds with boiling points greater than 40° C. and less than 40° C. also incorporates fluorinated compounds in the families of alkanes, alcohols, diones, acetates, ketones (e.g., butanones, pentanones), esters (e.g., propanoates), anhydrides, cycloalkanes (cycloparaffins), cycloalkenes (cycloolefins), heterocyclics (e.g., furans), and aromatics. The presence of one or more Cl and/or one Br atom enhances the sensitivity of halogen leak detection by as much as several orders of magnitude over F in halogen leak detectors. Tropodegradable compounds which contain only fluorine are also useful for leak detection enhancement.

In another embodiment of the present invention, the leak detection substance comprises a compound corresponding to Formula I:

$$C_qH_rBr_xCl_yF_zO_p(db)_s,$$ 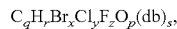 Formula I where q=1-10, r=0-5, x=0-2, y=0-2, z>1, p=0-3, and s=0-2, provided at least one of (a) p>0, when y>0,
(b) r>0, when y>0 and q>1,
(c) x>0, when y>0,
(d) s>0, when y>0, and
(e) y=0, when q=1.

The leak detection substance may be provided with a pressurizing agent or propellant. Further, a plurality of compounds as described above may be provided. In one embodiment, the leak detection substance is useful for detecting a leak in plumbing, duct-work, fluid system components, heat exchanger components, and heating, ventilation, air conditioning, and refrigeration components, or any one or more of these components.

Table 3 lists several common refrigerants that may be used as a pressurant or propellant.

TABLE 3

REFRIGERANTS AND THEIR PROPERTIES

| COMPOUND | MW | BP (° C.) | ODP |
|---|---|---|---|
| CFC-12, dichlorodifluoromethane | 121 | −30 | 1.0 |
| HCFC-22, chlorodifluoromethane | 86 | −41 | 0.05 |
| HFC-125, pentafluoroethane | 120 | −48 | 0.0 |
| HFC-32, difluoromethane | 52 | −52 | 0.0 |
| HFC-134a, 1,1,1,2-tetrafluoroethane | 102 | −26 | 0.0 |
| Refrigerant 410a (blend of HCF-32 and HFC-125) | na | −52 | 0.0 |

The boiling points of the refrigerants in Table 3 are very low, ensuring that the vapor phase will be predominantly present when sprayed into a leak area. This invention teaches the advantages of including a compound with a boiling point greater than about 40° C. or at least 40° C. as a leak detection fluid in certain HVAC/R leak detection applications such as furnaces. In other applications of this invention, it is preferable to use compounds which have a boiling point less than about 40° C. or no greater than 40° C., and/or a vapor pressure about the same as or greater than the propellant. In sealed systems used for refrigeration or air conditioning, and for which the working fluid has been evacuated prior to introducing the propellant and leak detection enhancement compounds, the leak detection enhancement compound would volatilize and/or be delivered as a vapor so that the vapor can migrate through the system to the site of leaks. Higher boiling point compounds would not be as effective for these embodiments since an appreciable amount of the leak detection enhancement compound would remain a liquid in the closed system and not a vapor. Although not required for this invention, it is preferable that these compounds contain at least 1 chlorine atom and/or at least one bromine atom and/or an oxygen atom, and/or a double-bond. Table 4 lists examples of compounds with boiling points less than about 40° C. or no greater than 40° C.

TABLE 4

PREFERRED COMPOUNDS, BP <40° C.

trifluoromethane (HFC-23)
difluoromethane (HFC-32)
Perfluoroethene
Perfluorodimethylether
Trifluoroethene
2,2,2-trifluoroethanal
pentafluoroethane (HFC-125)
trifluoromethyldifluoromethylether
1,1,2,2-tetrafluoroethane (HFC-134)
Difluoromethyl difluoromethyl ether
hexafluoropropene
hexafluoro-2-propanone
perfluorooxetane
trifluoromethyl trifluorovinyl ether
perfluoro-1,3-dioxalane
perfluorodimethoxymethane
1,1,3,3,3-pentafluoropropene-1
2H-heptafluoropropane (HFC-227 ea)
1H-heptafluoropropane (HFC-227 ca)
1H,1H-hexafluoropropane (HFC-236 cb)
1H,2H-hexafluoropropane (HFC-236 ea)
2H,2H-hexafluoropropane (HFC-236 fa)
2,2,2-trifluoro-(trifluromethyl)ethanol
Difluoromethyl-1,2,2,2-tetrafluorooethyl ether
bis(difluoromethoxy)-difluoromethane
1,1,1,3,3-pentafluoropropane (HFC-245 fa)
1,1,1,2,2-pentafluoropropane (HFC-245 cb)
1,1,2,2,3-pentafluoropropane (HFC-245 ca)
Difluoromethyl-1,1,2-trifluoroethyl ether

TABLE 4-continued

PREFERRED COMPOUNDS, BP <40° C.

methyl pentafluoroethyl ether
Difluoromethyl-2, 2, 2-trifluoroethyl ether
bis(pentafluoroethyl) ether
1,1,1,4,4,4-hexafluoro-2-butene
3,3,3-trifluoro-2-(trifluoromethyl)-propene
2-(fluoromethoxy)-1,1,3,3,3-pentafluoro-1-propene
1H,4H-octafluorobutane
1,1,1,3,3,3-hexafluoro-2-(difluoromethoxy)propane
pentafluoroethyl-2,2,2-trifluoroethyl ether
1,1,2,2-tetrafluoroethyl-2,2,2-trifluoroethyl ether
Difluoromethyl-2,2,3,3,3-pentafluoropropyl ether
methyl heptafluoroisopropyl ether
methyl heptafluoropropyl ether
2,2,2-trifluoro-1-(trifluoromethyDethyl fluoromethyl ether
1,1,1,2,2,4-hexafluorobutane
2,2,2-trifluoroethyl-1,1,2-trifluoroethyl ether
methyl-1,1,2,3,3,3-hexafluoropropyl ether
methyl-2,2,2-trifluroethy1-1-(trifluoromethyl)ether
1H,3H-octafluorocyclopentane
3,3,4,4,5,5,5-heptafluoro-1-pentene
2-chloro-pentafluoro-1,3-butadiene
2-chloro-1,1,1,4,4,4-hexafluoro-2-butene
3,3,3-trifluoro-2-chloro-1-propene
Chlorotrifluoro-ethene
1,1-dichloro-2,2-difluoro-ethene
2-chloro-1,1-difluorothene
1-bromo-1,1,4,4,4-pentafluoro-2-butene
3-bromo-perfluoropropene
1-bromo-perfluoropropene
2-bromo-1,3,3,3-tetrafluoropropene
1-chloro-1,1,3,3,3-pentafluoro-2-propanone
2-bromo-3,3,3-trifluoro-1-propene
3-bromo-1,1,3,3-tetrafluoropropene
1-bromo-3,3,3-trifluoro-1-propene
dibromodifluoromethane (Halon 1202)
2-chloro-1,1,1,2-tetrafluoroethane
1,2-dichloro-1,1,2-trifluoroethane
2,2-dichloro-1,1,1-trifluoroethane (HCFC-123)

For natural draft and high efficiency hot air furnaces, other ductwork leak detection applications, automobile radiator leak detection applications or any leak detection application where the system is not completely sealed from the environment, it is advantageous to introduce at least some of the leak detection enhancement compounds as a liquid since they will persist in the area of the leak for an extended period of time until all of the fluid has evaporated. This extends the leak detection time and provides a longer period of time for leak diagnosis.

For these applications where the system is not completely sealed from the environment, it is also desirable to use a compound which is much heavier than air. The compounds taught by this invention are also much heavier than refrigerant 22 (chlorodifluoromethane or HCFC-22), a commonly-used leak detection fluid. The molecular weights (MW) of the propellants and refrigerants in Table 3 are generally lower than the compounds of this invention, which means that they will stratify less in air over a given period of time. It is advantageous to have a heavier molecular which will diffuse through and travel via stratification to the leak detector sensor (e.g., see table 1). For the hot air furnace leak detection method, it is desirable to use a compound which is much heavier than air, so that when it is introduced into the conditioned air supply duct above the furnace it will fall down into the furnace rather than rise into the ductwork leading away from the furnace, (note the conditioned air blower is off during these leak tests, as proposed in the method disclosed herein). Likewise, when this leak detection is used to find leaks in automotive cooling systems, it is desirable to use a compound which is much heavier than air, so that when it is introduced into the fill port of a radiator it will fall down into the radiator and associated hoses rather than rise out of the fill port during the time it takes to replace the fill cap.

When the compounds used in this invention are to be sprayed into an area to be leak checked, it is important that the compounds of this invention are soluble in the propellant used for spraying the mixture if the propellant or pressurant is a two-phase fluid (gas and liquid). The compounds of this invention are also generally soluble in refrigerants, which can be used as a propellant or pressurant, or the leak detection enhancement compounds can be introduced into an HVAC/R working fluid (e.g., refrigerant). When the compounds used in this invention are to be introduced into charged vapor compression systems to improve leak detection sensitivity, then it is important that these compounds are soluble in the refrigerant used in the system. For example, the compounds taught by this invention are generally soluble in HCFC-134a, which has a solubility parameter of 6.6. The leak detection enhancement compounds of this invention have solubility parameters of around 7, which indicate that they should be soluble in most refrigerants.

Preferred propellants or pressurants which can be used with these compounds include, but are not limited to: (a) Nitrogen, (b) Air, (c) Argon, (d) Nitrous oxide, (e) Carbon dioxide, (f) 1,1,1,2-tetrafluoroethane (HFC-134a), (g) Chlorodifluoromethane (HCFC-22), and (h) Blends of HFC-125 and HFC-32 (including HFC-410A or R-410A).

Butane, isobutane, and propane may also be used, though their flammability must be considered. They are particularly suitable for leak detection in systems where flames, heat or other ignition sources are not present. Pressurants such as nitrogen, argon or air are typically used to pressurize vessels with the leak detection fluid to a pressure greater than that surrounding the vessel.

The compositions also contain compounds which have a high number of halogens per mole (x+y+z greater or equal to 3) as shown in Table 1, and many of which contain at least one chlorine or bromine atom. Halogen leak detectors, which function directly or indirectly by the ionization of the gas or vapor species, are commonly used in the HVAC/R industry to diagnose systems. These detectors are generally more sensitive to Cl than F, so the inclusion of a Cl or Br containing molecule is advantageous to improving leak detection capability by as much as 20-1000×. It is possible to include Cl- and Br-containing compounds for leak detection since the molecules they are present on have a low ODP, in contrast to CFC's, for example, which have a high ODP and can no longer be vented or even produced in the United States under the Clean Air Act (as part of the U.S. cooperation in the Montreal Protocol Treaty among nations). The compounds of this invention are generally classified as tropodegradable, and therefore have a much lower ODP than other compounds, especially those which contain Cl. The structural vulnerabilities of these compounds render the molecules unstable and within a fairly short period of time after release, they break down and are no longer part of the atmosphere. The tropodegradable compounds of this invention which contain only fluorine are also advantageous for halogen leak detection enhancement since the compounds are more easily broken down and they generally contain a large number of fluorine atoms per mole of compound.

The compounds of this invention are generally classified as tropodegradable, and therefore have a much lower ODP than other compounds, especially alkanes such as CFC's and HCFC's. Tropodegradable compounds are defined as compounds having structural weaknesses to ensure rapid decay in the troposphere. When this class of compounds is exposed to sunlight (photolysis) and other chemical radicals (e.g., hydroxyls) in the atmosphere, they decay into forms that do not damage the ozone layer nor contribute to the greenhouse effect. The structural weaknesses can take such forms as hydrogen being present on the molecule, a carbon-carbon double bond that is vulnerable to reactions, an ether bond, or a bromine atom being present for easy degradation. These structural vulnerabilities render the molecules unstable and within a fairly short period of time, they break down and are no longer part of the atmosphere.

FIG. 1 illustrates a typical high efficiency condensing gas furnace and the following discussion discloses one preferred embodiment for detecting leaks in these furnaces. In addition to the blower 2 used in all hot air furnaces to force the return air 6 through the heat exchanger and then force this air 13 out of the furnace and into the conditioned space, the high efficiency condensing furnaces also requires a combustion air blower 3. Air for the combustion is drawn in either from outside or from the indoor air surrounding the furnace. This air enters the furnace at 12 and is plumbed in some fashion (not shown in FIG. 1) to the combustion air intake at 15. The combustion fuel enters through gas nozzle jet 16 and is ignited so that combustion of the fuel and air occurs at some point within the entrance region of heat exchanger 10. After combustion, the combustion gas, combustion by-products and combustion residue, are cooled in the heat exchanger 10, as shown in FIG. 1. While there are many possible configurations for this air to air heat exchanger, FIG. 1 displays a configuration where the heat exchanger is comprised of combustion gasses 21 flowing inside the heat exchanger and indoor air to be heated 11 flowing over the outside of this heat exchanger, separated by a barrier wall 20. This invention will detect leaks not only in heat exchanger barrier wall 20 but in any barrier designed to keep the indoor air from being contaminated with the combustion gases.

The combustion blower 3 is necessary because the combustion air has been cooled to remove all heat from the combustion, and there is insufficient buoyancy force for this combustion air to rise naturally in a chimney. Another complicating factor is that since water is a product of the combustion, when the combustion gasses are cooled to remove all possible heat energy, the water vapor condenses in the exhaust stream. Therefore these high efficiency furnaces are also referred to as condensing furnaces, and the condensed water must be removed from the exhaust stream. To remove the condensed water, these high efficiency furnaces are equipped with a water separator 4, typically referred to as a drain trap, in the exhaust line from the furnace which separates the condenser water 19 from the exhaust stream. This water then drains by gravity or is pumped to an acceptable waste drain or to the outdoors depending on local building code requirements. In addition to the water separator on the exhaust line, the combustion blower is also at location where condenser water will collect, so this blower housing has a condensate drain line 8 as well.

We have devised a method of determining leaks, cracks or other improper pathways between the combustion gases and the conditioned air to be heated and introduced into the living space. Of course if such a leak exists, then it is possible for combustion products to enter into the breathing air, causing health problems including death. One common, but indirect method for determining the integrity of the heat exchanger or exchangers between the conditioned air and the combustion air is to use a carbon monoxide detector in the conditioned air. If carbon monoxide is detected in the conditioned air, then dangerous toxic gases are leaking into the building environment and there must be a leak in the heat exchanger or some other component allowing the gas to enter. However, if carbon monoxide is not detected it does not necessarily mean that there is no leak. It could also mean than the conditioned air pressure is greater than the combustion air pressure thereby preventing combustion air from entering the conditioned air at the time of the test. This situation could change rather quickly a) if the condensate were to fail to drain thereby raising the back pressure in the exhaust line, or adversely affecting the blower's speed, b) if the combustion blowers speed should degrade with age, c) if the dynamic wind pressure on the exhaust pipe should change, thereby changing the pressure distribution in the exhaust line, d) if the performance of the conditioned air blower should change, due to a failed or degrading blower unit or a clogged supply air filter. If carbon monoxide is not detected it could also mean that the leak is below the detection level, since this leak of toxic gas is mixed with the large volume of air that is circulated into the conditioned space. While the concentration might be below measurable limits at one point in time, unless there is 100% ventilation, which is very rare, the concentration will continue to increase over time and could eventually reach a deadly concentration. Clearly, looking for combustion products in the conditioned air does not guarantee the integrity of the separation between conditioned air and combustion air (and combustion products) in the furnace.

A method to directly determine if there are any leakage pathways between the conditioned air and the combustion air is therefore extremely desirable. We have developed such a method of leak testing. For these high-efficiency condensing furnaces and boilers, our approach uses the combustion blower 3 of the furnace (or boiler) 1 to draw an indicator gas (such as the leak detection fluid disclosed herein or any other fluid which could trigger a suitable gas detector) through any potential pathways. It the detector fluid is a liquid at room temperature, it could be sprayed into the system using mechanical hand pump or aerosol sprayers and these methods are well known in the field. The indicating liquid fluid could also be painted or brushed onto the surfaces. Other methods of introducing the indicator fluid include injecting it as a liquid and then heating the system, with a heat lamp for example. If the indicating substance is a gas at room temperature, in can be introduced using any of the well known methods of introducing a gas into a system. Clearly, there are numerous means of introducing this substance into a suspected space all of which are well known to one skilled in the art. However, as a means of example, one possible series of steps to the process are described below for a high-efficiency condensing hot air gas furnace. For a high-efficiency condensing hot water furnace or boiler, the method is essentially the same, except the indicating fluid is introduced into the water or steam pipe (which supplies the heated water or steam) instead of the air duct.

Referring to FIG. 1:

1) For the High Efficiency Condensing Hot Air Furnace, access to the condensed water drain line is obtained by removing a condensate drain line 8 from the combustion blower 3, or the condensate drain line 18 from the condensate trap 4. Alternatively of course a hole in the exhaust line 9 from the combustion blower or in the exhaust line 17 after the water trap can be made and later sealed. An ordinary halogen refrigerant leak detector probe is placed in this combustion air exhaust stream.

2) The probe of a standard halogen leak detectors, also known in the industry as a refrigerant leak detector, is introduced into this exhaust stream, either via the condensate drain line opening 8 or 18 or through the hole made in the exhaust line at 9 or 17.

3) The combustion blower is operated, but the remaining blowers and the furnace flame are not activated. This can be performed by running temporary jumper wires to the blower. However an even simpler approach is to disconnect the combustion blower pressure safety switch, by removing the pressure hose which connects it to the blower housing, and activate the furnace from the thermostat. The starting sequence of the furnaces will allow the combustion blower 3 to operate, but keep all other components off, since the combustion blower's operation, which is the first step in the furnace start up sequence is not detected (due to the disconnected hose) and therefore the furnace flame is not activated (the next step) and the conditioned air blower 2 is not energized, (because no heat in the plenum is detected). The normal forced-flow of conditioned air; that is the inlet air flow at 6, forced air flow 11 over the heat exchanger 10 and outflow at 13, does not develop because the conditioned air blower, also referred to as the air handler blower, is not activated. It would not be advantageous to activate this blower since it would force the leak detection fluid throughout the building instead of letting it settle around the heat exchanger 10 and other barriers separating the conditioned air from the combustion gases.

4) To increase sensitivity of the leak detection method the combustion air intake 15 can be temporarily sealed (blocked), by using duct tape, for example. In this way, the air supplied to the combustion blower is primarily drawn through any leaks in the separating wall 20 between the combustion gasses 21 and the conditioned air or through any other open improper pathways between the combustion air and the conditioned air.

5) The leak detection fluid is introduced into the conditioned air exhaust at the conditioned air discharge from the unit 13. One method of accomplishing this is to package the leak detection fluid in a pressurized aerosol can. If the vapor pressure of the leak detection fluid is insufficient to pressurize the can, then the liquid can be pressurized for proper atomization using any number of known propellants including, but not limited to HFC-134a (1,1,1,2-tetrafluoroethane), blends of HFC-125 and HFC-32 (refrigerant 410A), nitrous oxide, nitrogen, carbon dioxide, or compressed air. A small hole or existing access port along with a nozzle extension tube on the aerosol can be used to introduce the vaporized detection fluid into the ductwork 14 just above the conditioned air supply 13. Other means to introduce the leak detection fluid include painting or otherwise coating the surface of the heat exchanger where a leak may be suspected.

6) If there is a leak or other improper pathway between the combustion air and the conditioned air then the halogen leak detector (refrigerant detector) will indicate the presence of the leak indicating fluid in the combustion air stream 22, even though it was introduced into the into the conditioned air side at location 13. The leak indicating fluid being drawn though the leak or improper pathway by the action of the combustion blower 3, and its presence being detected by the halogen leak detector which is located in the combustion exhaust stream 22, that is in the combustion blower exhaust stream 22

For natural draft and other heat exchangers that need to be checked for leaks, the procedure depends somewhat on the hardware configuration, however the basic concept is to introduce the indicator fluid on one side of the heat exchanger and use the halogen leak detector to sniff for the presence of the indicator gas on the other side of the heat exchanger.

For vapor compression systems and other closed (sealed) plumbing systems, the procedure is to introduce the indicator fluid into the sealed system, optionally increase the pressure with an EPA acceptable pressurant, such as nitrogen, and use the halogen leak detector to sniff for the presence of the indicator gas at all exterior surfaces. Of course this is the method currently used in the vapor compression field to look for leaks in vapor compression systems containing a refrigerant, however the Federal Clean Air Act only allows (1) leak checking to be performed with the refrigerant contained in the system, which can not by federal law be vented into the atmosphere due to the Ozone Depletion Potential or (2) leak checking with an HCFC-22 nitrogen leak check gas mixture which does not need to be recovered, and can be vented into the atmosphere. The compounds of this invention can also be directly injected or made part of a vapor compression system working fluid (e.g., refrigerant) to boost the leak detection capability under normal operation of the vapor compression system.

In the case of detecting leaks from vapor compression systems with hydrofluorocarbons (HFC's) refrigerants, the halogen leak detectors are not very sensitive to these non-chlorine containing leak detection methods because Cl is much more easily ionized than F from organic molecules. HFC's also do not contain structural vulnerabilities such as carbon-carbon double bonds or ether bonds, which would promote the breakdown and ionization of the compounds. Since many of the current leak detectors use halogen ions in some manner to generate an electrical signal, Cl-containing compounds can produce sensitivity differences of about 20-1000 times compared to fluorine compounds. Tropodegradable compounds are also more easily broken down, even when they contain only fluorine, which also provides for leak detection enhancement.

Alternatively, the EPA does allow a vapor-compression system to be leak checked by introducing a small quantity of HCFC-22, (chlorodifluoromethane) into a sealed vapor compression system and then to pressurize the system with nitrogen. Since many of the current leak detectors use halogen ions in some manner to generate an electrical signal, Cl-containing compounds can produce sensitivity differences of about 20-1000 times compared to fluorine compounds. This mixture can be vented to the atmosphere after leak checking. These systems can not be pressurized with air because of the explosion potential of HCFC-22 with oxygen. The compounds of this invention are non-flammable and therefore have considerable advantageous and latitude with respect to the pressurant which can be used. The leak detection fluid proposed herein, is also superior to the use of HCFC-22 and nitrogen mixtures because it will provide a more sensitive response in halogen leak detectors while possessing a much lower Ozone Depletion Potential (ODP) (The ODP is at least 2.5 times lower than HCFC-22). This invention is also better than using the HFC refrigerants themselves since halogen leak detectors are at least 20 times more sensitive to the leak detection fluids of this invention compared to HFC-134a for example and other HFC refrigerants (e.g., 410A).

Figure 2:
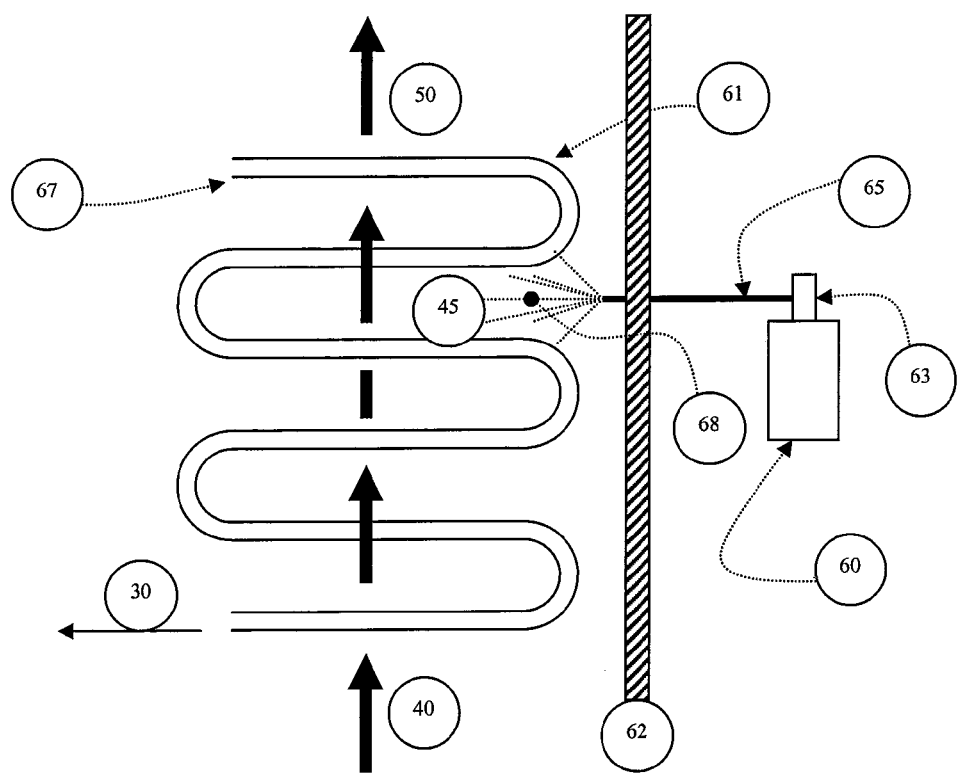
FIG. 2 shows a diagram of a heat exchanger.

FIG. 2 illustrates another embodiment of this invention, a heat exchanger (e.g., a gas furnace). In operation, a fluid (gas or liquid) enters at 67 and flows through heat exchanger tubes 20 whereby the fluid is heated or cooled. A second fluid (gas or liquid) 40 passes over the outside of the heat exchanger tubes 61 and is heated or cooled as a result of its temperature difference with the fluid inside the tubes, exiting at 50. Leaks can develop in the heat exchanger tubes such as this which are contained within an enclosure 62, not typically accessible without disassembly of the device and connecting passages, or removal of enclosure 62. A leak detection fluid can be placed in a pressured can 60, with an attached nozzle 63 and straw 62. The straw 65 can be used to penetrate the enclosure wall 62, typically comprised of duct board in the case of a gas furnace, and sprayed 68 into the heat exchanger cavity 45. If a leak is present in the heat exchanger tubes, the leak detection fluid will diffuse to the inside of the heat exchanger tubes. The leak detection fluid can then be detected by a halogen leak detector device at point 30, for example, by diffusion and gravity stratification within tube 61. The leak detection fluid spray 68 is comprised of gaseous species and liquid species in the form of small droplets. In the case of a liquid-liquid or liquid-gas heat exchanger, the liquid in heat exchanger tubes 61 or liquid 40 in cavity 45 can first be evacuated. In the case of a gas-gas heat exchanger, it may not be necessary to evacuate fluid in 61 or fluid 40 in cavity 45, unless the pressure inside 61 and/or 45 are substantially higher than 1 atmosphere. In the case of a gas furnace, the fluids in 61 and 45 are both air, and no evacuation is needed prior to introducing the leak detection spray. For a gas furnace, the combusted gas inlet would be at location 67. In another embodiment, the leak detection spray 68 could be introduced at point 67, and the leak detection device could be positioned on the outside of the heat exchanger tubes in cavity 45. In a further embodiment for gas-liquid heat exchangers, the enhanced leak detector fluids of this invention could be introduced without a propellant directly into the liquid side of the heat exchanger, and leaks could be detected on the gas side of the heat exchanger.

Another embodiment of this invention is for leak detection in a refrigeration system. The enhanced leak detection compounds can be introduced into a refrigeration system through the low pressure port. Joints or locations suspected to be leaking can then be inspected using a halogen leak detector. On a refrigeration system, leaks can also be detected by evacuating the system of refrigerant and introducing the leak detection enhancers taught by this invention along with an optional pressurant gas such as nitrogen or HFC-134a. In this embodiment, the leak detection enhancer compounds can be introduced with the pressurant or separately. Compounds with vapor pressures about the same or greater than the propellant are preferred for this embodiment to ensure mobility of the leak detection compound vapor to leak sites, but compounds such as those listed in Tables 1 and 2 can also be effective and provide advantages in leak detection enhancement.

Figure 3:
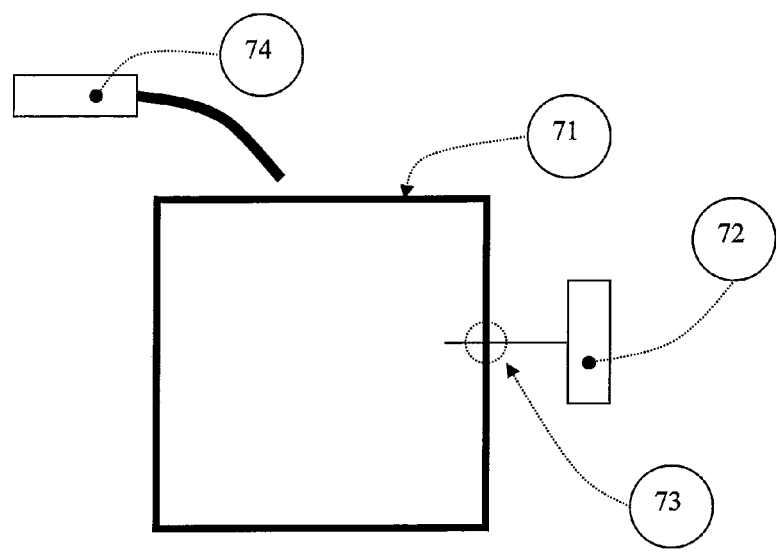
FIG. 3 shows a diagram of an external leak detection system.
Figure 4:
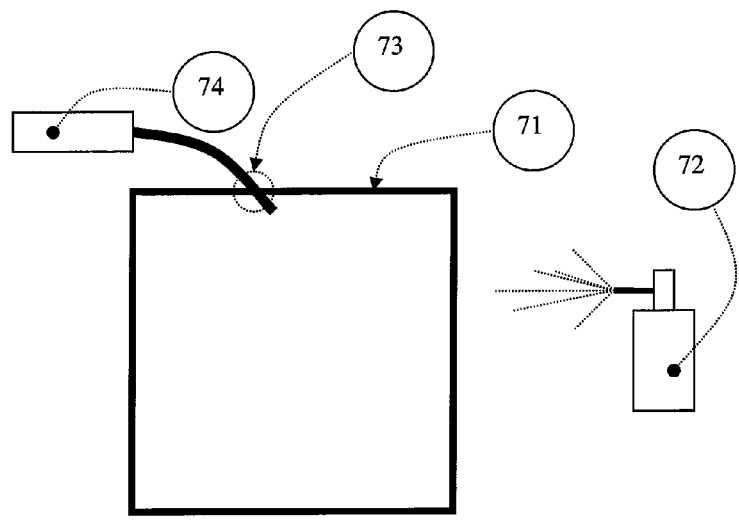
FIG. 4 shows a diagram of an internal leak detection system.

Other embodiments contemplated for this invention include fluid handling systems or fluid reservoirs such as heat exchangers (e.g., automotive radiators), oxygen handling systems, cryogenic systems, fuel tanks, automotive tires and any other sealed system designed to contain a vacuum or positive pressure above ambient pressure. The general application contemplated is depicted in FIGS. 3 and 4. In FIG. 3, illustrating external leak detection, the leak detection fluid 72 is introduced into vessel 71 through port 73. Port 73 can be a valve, hole or other entry point. A halogen leak detector 74 is then used to inspect the outer surface of 71 for leaks. As illustrated by FIG. 4 for internal leak detection, the compositions of this invention can be used to detect leaks inside a vessel by locating the leak detector 74 inside the vessel 71 through port 73 when applying the leak detection formation 72 around the outer surface of vessel 71.

EXAMPLES OF CERTAIN EMBODIMENTS OF THE INVENTION

Example 1

A composition of 15 wt. % 1-chloro-2,2,2-trifluoroethyl difluoromethyl in HFC-134a was mixed and sealed in a pressurized can. The total weight of mixture in the can was about 100 grams. The furnace used for the tests is depicted in FIG. 1. A small-hole access port along with a nozzle extension tube on the aerosol was used to introduce the vaporized detection fluid into the ductwork 14 just above the conditioned air supply 13. The composition was then sprayed into a sealed furnace with a series of holes ranging in diameters between 0.024" and 0.081" to simulate leaks. All holes but one size were exposed during each test. The probe of an Inficon TEK-Mate® refrigerant leak detector was introduced into the exhaust stream via the condensate drain line opening 18 in FIG. 1. The composition was sprayed for 5 sec, and a strong leak was detected within 5 sec of starting the spray for all of the hole sizes. Similar results were measured with 5 and 10 wt. % 1-chloro-2,2,2-trifluoroethyl difluoromethyl in HFC-134a.

Example 2

Combinations of HFC-134a, 1-chloro-2,2,2-trifluoroethyl difluoromethyl ether, and 4-bromo-3-chloro-3,4,4-trifluoro-1-butene were prepared in a spray can with 4-bromo-3-chloro-3,4,4-trifluoro-1-butene at 0.4 wt. % and 1-chloro-2,2,2-trifluoroethyl difluoromethyl ether at 4 wt. %, and the remainder consisting of HFC-134a. Using an Inficon D-TEK® halogen leak detector, compositions containing the leak detection enhancers produced a substantially stronger signal than HFC-134a alone when sprayed in open air in the vicinity of the leak detector. Compositions containing 1-chloro-2,2,2-trifluoroethyl difluoromethyl also produced more sensitive response than those compositions containing only 4-bromo-3-chloro-3,4,4-trifluoro-1-butene.

Example 3

A copper tube was configured with small holes ranging in diameter from 0.024 inches to 0.063 inches. The tube was purged with nitrogen at one end and the leak detector was placed at the other open end. The formulations of example 2 were sprayed on the outside of the tube over each of the holes all but one hole size was covered for each test. The leak detector response generally increased as the hole size (i.e., simulated leak) increased, and the formulations containing 1-chloro-2,2,2-trifluoroethyl difluoromethyl ether and 4-bromo-3-chloro-3,4,4-trifluoro-1-butene produced a stronger leak detection signal than HFC-134a alone for all hole sizes. This test is representative of leak detection in any plumbing or piping system, including, but not limited to, a heat pump, air conditioner, automotive radiator, heat exchanger or refrigerator.

Example 4

Solutions of HFC-134a and 1-chloro-2,2,2-trifluoroethyl difluoromethyl ether (isoflurane) at 5, 10, and 15 wt. % were prepared in a glass tube. The isoflurane was completely soluble in the HFC-134a.

Example 5

The leak detection enhancing compound 1-chloro-2,2,2-trifluoroethyl difluoromethyl ether (isoflurane) was injected with HFC-134a into an evacuated vapor compression system with HFC-134a using the device of U.S. Pat. No. 5,996,651. The final composition of the 1-chloro-2,2,2-trifluoroethyl difluoromethyl ether in the system was varied between 2.5 and 20% by weight. Leaks were detected in the system using a halogen leak detector.

While the invention has been described with reference to certain exemplary embodiments thereof, those skilled in the art may make various modifications to the described embodiments of the invention without departing from the true spirit and scope of the invention. The terms and descriptions used herein are set forth by way of illustration only and not meant as limitations. In particular, although the present invention has been described by way of examples, a variety of devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the spirit and scope of the invention as defined in the following claims and their equivalents.

What is claimed is:

1. A method for detecting a leak in a furnace system, comprising the steps of:
    optionally blocking a combustion air intake;
    activating a combustion blower;
    providing a leak detector probe in a combustion exhaust stream;
    introducing at least one leak detection fluid into a furnace supply air duct, said at least one leak detection fluid being selected from the group consisting of:
    4-bromo-3-chloro-3,4,4-trifluoro-1-butene,
    1-chloro-2,2,2-trifluoroethyl difluoromethyl ether,
    2-chloro-1,1,2-trifluoroethyl difluoromethyl ether,
    1-bromo-2-(trifluoromethyl)-3,3,3-trifluoropropene,
    methyl 2,2,2-trifluoroethyl-1-(trifluoromethyl)ether,
    4-bromo-1,1,1,3,4,4-hexafluoro-2-(trifluoromethyl)-2-butene,
    heptafluoropropyl 1,2,2,2-tetrafluoroethyl ether,
    perfluorodibutyl ether,
    4-bromo-1,1,1,4,4-pentafluoro-2-(trifluoromethyl)-2-butene,
    methyl perfluorobutyl ether,
    3-bromo-1,1,2,3,4,4,4-heptafluorobutene,
    1-bromo-1,3,3,3-tetrafluoro-2-(trifluoromethyl)-1-propene,
    4-bromo-1,1,2,3,3,4,4-heptafluorobutene,
    2-bromo-1,1,1,3,4,4,4-heptafluoro-2-butene,
    3,3,3-trifluoro-bis-2,2-(trifluoromethyl)-1-propanol,
    1,2-(Z)-bis(perfluoro-n-butyl)ethylene,
    1,1,1,3,3,3-hexafluoro-2-(trifluoromethyl)-2-propanol,
    2H,3H-decafluoropentane,
    ethyl perfluorobutyl ether,
    1-bromo-perfluoro-2-butene,
    1,1,1,5,5,5-hexafluoro-2,4-pentanedione,
    perfluoro-2-butyltetrahydrofuran,
    1H,2H,4H-nonafluorocyclohexane,
    (E)-2-bromo-1,1,1,4,4,4-hexafluoro-2-butene,
    1-bromo-bis(perfluoromethyl)ethylene,
    1-(bromodifluoromethoxy)-2-(trifluoromethyl)-1,3,3,3-tetrafluoro-1-propene,
    1-methoxy-2-trifluoromethyl-1,3,3,3-tetrafluoro-1-propene,
    fluoromethyl 2,2,2-trifluoro-1-(trifluoromethyl)ethyl ether,
    (E)-2,3-dichlorohexafluoro-2-butene, 2-bromo-3,3,4,4,4-pentafluorobutene,
3-bromo-2,3,4,4,4-pentafluorobutene,
4-bromo-2,3,3,4,4-pentafluorobutene,
1-(bromodifluoromethoxy)-1,2,3,3,3-pentafluoro-1-propene,
3-bromo-3,3-difluoro-2-(trifluoromethyl)-propene,
1-bronco-1,1,4,4,4-pentafluoro-2-butene,
3,3-dichloro-1,1,1,2,2-pentafluoropropane (HCFC-225),
1-(bromodifluoromethoxy)-2-(trifluoromethyl)-3,3,3-trifluoro-1-propene,
methyl 1,1,2,2,3,3-hexafluoropropyl ether,
trifluoroacetic anhydride,
2-bromo-1,1,2,2-tetrafluoroethoxy-trifluoroethene,
2,2-difluoroethyl 1,1,2,2-tetrafluoroethyl ether,
1,3-dichloro-1,1,2,2,3-pentafluoropropane,
bis(2,2,2-trifluoroethyl)ether,
methyl heptafluoropropyl ketone,
difluoromethyl 2,2,3,3-tetrafluoropropyl ether,
4-bromo-3,3,4,4-tetrafluoro-1-butene,
bis(difluoromethoxy)-tetrafluoroethane,
1-(2,2,2-trifluoroethoxy)nonafluoro-cyclohexene,
1,2-dichloro-3,3,4,4,5,5,6,6-octafluoro-cyclohexene,
(Z)-1-bromo-1,2-difluoro-2-(2,2,2-trifluoroethoxy)ethane,
(bromodifluoromethyl)-pentafluorobenzene,
1-(bromodifluoromethoxy)-2-(trifluoromethyl)ethane,
2-bromoheptafluorotoluene,
(2,2,2-trifluoroethyl)(2-bromo-2,2-difluoroethyl)ether,
3-bromoheptafluorotoluene,
4-bromoheptafluorotoluene,
1-(bromodifluoromethoxy)-1-(trifluoromethyl)ethane,
perfluorotoluene,
methyl trichloroacetate,
1-bromo-2,4,6-tris(trifluoromethyl)benzene,
methyl pentafluoropropanoate,
4-bromo-1,1,2,3,3-pentafluorobutene,
1-(bromodifluoromethoxy)-2-(trifluoromethoxy)ethane,
1,1,4,4,4-pentafluoro-1-bromo-2-butanone,
1,1,5,5,5-pentafluoro-1-bromo-3-pentanone,
1,2-dichloro-hexafluoro-cyclopentene,
3-bromo-2,3,3-trifluoropropene,
(Z)-3-bromo-1,3,3-trifluoropropene, and
3-bromo-3,3-difluoro-1-propene; and
monitoring output from the leak detector probe.

2. The method of claim 1, wherein the furnace system is a high efficiency furnace system.

\* \* \* \* \*